US009573818B2

(12) United States Patent
Akolekar et al.

(10) Patent No.: US 9,573,818 B2
(45) Date of Patent: Feb. 21, 2017

(54) COMPOSITIONS AND PROCESSES FOR MESOPOROUS SILICAS HAVING LARGE PORES WITH NARROW DIAMETER DISTRIBUTIONS

(71) Applicant: Dow Global Technologies LLC, Midland, MI (US)

(72) Inventors: Deepak Akolekar, Pune (IN); Phani Kiran Bollapragada, Pune (IN); Santosh Khokarale, Pune (IN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/431,038

(22) PCT Filed: Sep. 23, 2013

(86) PCT No.: PCT/US2013/061251
§ 371 (c)(1),
(2) Date: Mar. 25, 2015

(87) PCT Pub. No.: WO2014/055281
PCT Pub. Date: Apr. 10, 2014

(65) Prior Publication Data
US 2015/0246817 A1  Sep. 3, 2015

Related U.S. Application Data

(60) Provisional application No. 61/708,229, filed on Oct. 1, 2012.

(51) Int. Cl.
*C01B 33/12* (2006.01)
*C01B 37/02* (2006.01)

(52) U.S. Cl.
CPC ............ *C01B 33/12* (2013.01); *C01B 33/126* (2013.01); *C01B 37/02* (2013.01); *C01P 2006/12* (2013.01); *C01P 2006/14* (2013.01); *C01P 2006/16* (2013.01); *Y10T 428/2982* (2015.01)

(58) Field of Classification Search
CPC ........ C01B 37/02; C01B 33/12; C01B 33/126; C01P 2006/16; C01P 2006/12; C01P 2006/14; Y10T 428/2982
USPC .......................................... 428/402; 423/335
See application file for complete search history.

(56) References Cited

U.S. PATENT DOCUMENTS

| 8,889,044 B2 | 11/2014 | Yano et al. |
| 2009/0142565 A1 | 6/2009 | Takahashi et al. |
| 2012/0256336 A1 | 10/2012 | Yano et al. |

FOREIGN PATENT DOCUMENTS

EP   2030949   * 3/2009

OTHER PUBLICATIONS

Batista et al: "Controlling silicate meso-structures using sucupira oil as a new swelling agent" ASC, Elsevier, Amsterdam, NL, vol. 258, No. 12, Jan. 26, 2012, pp. 5111-5116.*
Yang, et al: "Synthesis of micrometer-sized hard silica spheres with uniform mesopore size and texturral pores'" JOCAIS, Academic Press, NY, NY, US, vol. 299, No. 2, Jul. 15, 2006, pp. 823-830.*
Radin et al, The controlled release of drugs from emulsified, sol gel processed silica microspheres, Biomaterials, 2009, pp. 850-858.
Mellati et al, Microencapsulation of *Saccharomyces cerevisiae* using a Novel Sol-Gel Method and Investigate on its Bioactivity, Asian Journal of Biotechnology, 2010, pp. 127-132.
Li et al, Synthesis of stable hollow silica microspheres with mesoporous shell in nonionic W/O emulsion, ChemComm, 2002, pp. 2434-2435.
Li et al, Hollow Spheres of Mesoporous Aluminosilicate with a Three-Dimensional Pore Network and Extraordinarily High Hydrothermal Stability, Nano Letters, 2003, pp. 609-612.
Zhu el al, Stimuli-Responsice Controlled Drug Release fro a Hollow Mesoporous Silica Sphere/Poly-electrolyte Multilayer Core-Shell Structure, Angewandte Chemie, 2005, pp. 5083-5087.
Fowler et al, Interfacial Syntheses of Hollow Microspheres of Mesostructured Silica, ChemComm, 2001, pp. 2028-2029.
Zhang et al, Facile Synthesis of Monodisperse Microspheres and Gigantic Hollow Shells of Mesoporous Silica in Mixed Water-Ethanol Solvents, Langmuir, 2007, pp. 1107-1113.
Fujiwara et al, Preparation and Formation Mechanism of Silica Microcapsules (Hollow Sphere) by Water/Oil/Water Interfacial Reaction, Chemistry of Materials, 2004, pp. 5420-5426.
Li et al, Synthesis and Characterization of Stavle Hollow Ti-Silica Microspheres with a Mesoporous Shell, Chemistry of Materials, 2005, pp. 2241-2246.
Zhang et al, Synthesis and Characterization of Amino-Functionalized Mesostructured Cellular Foams with Large Mesopores using Microemulsion Templating, Scripta Materialia, 2004, pp. 343-347.
Li et al, Synthesis and Characterization of MCM-41-Supported Ba2SiO4 Base Catalyst, Microporous and Mesoporous Materials, 2003, pp. 105-111.

(Continued)

Primary Examiner — Leszek Kiliman
(74) Attorney, Agent, or Firm — Dinsmore & Shohl LLP

(57) ABSTRACT

A process for preparing a mesoporous silica comprising contacting as starting components (1) a structure-directing template selected from the group consisting of hydrogenated and non-hydrogenated natural vegetable oils, silicone oils, and combinations thereof; (2) water; (3) silica; and, optionally, (4) a structure-directing co-template selected from tetramethylammonium hydroxide, tetraethylammonium hydroxide, tetrapropylammonium hydroxide, cetyltrimethylammonium bromide (CTAB), hexadecyltrimethylammonium chloride; hexadecyltrimethylammonium hydroxide hydrate, hexadecyltrimethylammonium p-toluenesulfonate, hexadecyltrimethylammonium bis-sulfonate, poloxamers having a weight average molecular weight ranging from 5,000 to 20,000 Daltons (Da), and combinations thereof; in the substantial absence of an alcohol solvent; under conditions such that a mesoporous silica having an average pore diameter ranging from 50 to 175 angstroms and a pore diameter distribution that, within one standard deviation of its mean, is substantially unimodal, is formed. The product composition may offer preferred use in, for example, gas separations, sensing, water purification, heavy metal removal, and electronics, where its narrower pore diameter distribution increases its selectivity.

8 Claims, 9 Drawing Sheets

(56) References Cited

OTHER PUBLICATIONS

Kim et al, Polysulfone and Mesoporous Moleculat Sieve MCM-48 Mixed Matrix Membranes for Gas Separation, Chemistry of Materials, 2006, pp. 1149-1155.
Batista et al, Controlling silicate meso-structures using sucupira oil as a new swelling agent, Applied Surface Science, 2012, pp. 5111-5116.
Yang et al, Synthesis of micrometer-sized hard silica spheres with uniform mesopore size and textural pores, Journal of Colloid and Interface Science, 2006, pp. 823-830.
Beck et al, A new family of mesoporous molecular sieves prepared with liquid crystal templates, Journal of the American Chemical Society, 1992, pp. 10834-10843.
Brigante et al, Synthesis of mesoporous silicas in alkaline and acidic media using the systems cetyltrimethylammonium tosylate (CTAT)-Pluronic F127 triblock copolymer and CTAT-Pluronic F68 triblock copolymer as templates, Journal of Colloid and Interface Science, 2012, pp. 71-81.
Feng et al, Monolithic Mesoporous Silica Templated by Microemulsion Liquid Crystals, Journal of the American Chemical Society, 2000, pp. 994-995.
PCT/US2013/061251, International Search Report dated Apr. 10, 2014.
PCT/US2013/061251, International Preliminary Report on Patentability dated Apr. 7, 2015.
PCT/US2013/061251, Written Opinion of the International Searching Authority dated Apr. 1, 2015.
Office Action dated May 12, 2016 pertaining to Chinese Patent Application No. 201380060070.X.

\* cited by examiner

COMPOSITIONS AND PROCESSES FOR MESOPOROUS SILICAS HAVING LARGE PORES WITH NARROW DIAMETER DISTRIBUTIONS

REFERENCE TO RELATED APPLICATIONS

The present application claims the benefit of U.S. Provisional Application No. 61/708,229, filed on Oct. 1, 2012.

BACKGROUND

Field of the Invention

This invention relates to the field of mesoporous silicas. More particularly, it relates to mesoporous silicas prepared using natural and synthetic oils, having relatively large pore diameters and relatively narrow, substantially unimodal pore diameter distribution ranges.

Background of the Art

Mesoporous materials have been known to researchers for many years, and are used for a variety of applications. In general these materials are inorganic solid materials characterized by a porous structure which is formed of channels or pores that frequently have average diameters in a general range of from 2 to 50 nanometers (nm). These channels or pores may be relatively uniform, with fairly constant diameters, or non-uniform, with a variety of diameters. The porous structure provides for a large internal surface area with adsorptive capacity for molecular species which are capable of entering therein.

Mesoporous materials may be amorphous or crystalline. Examples of mesoporous materials include synthetic and natural crystalline pure silicates and aluminosilicates. Such may also be referred to as framework aluminosilicates, where the framework is based on a three-dimensional network of $[(Al,Si)_4]$ tetrahedra which are linked to each other, at their corners, by shared oxygen atoms.

However, despite successful use of such mesoporous silica materials in certain applications, some of these materials suffer from less than desirable selectivity. Such may be due to, for example, less than desirable uniformity in pore diameters, i.e., broad pore diameter distributions, or to pore diameters that are too small for larger molecules, such as certain biomolecules. In view of this, it is desirable to develop new means of modifying silica-based mesoporous materials to reduce or eliminate one or more of these problems.

SUMMARY OF THE INVENTION

In one aspect the invention provides a process for preparing a mesoporous silica comprising contacting as starting components (1) a structure-directing template selected from the group consisting of partially and fully hydrogenated and non-hydrogenated oils and combinations thereof; (2) water, (3) silica; and, optionally, (4) a structure-directing co-template selected from tetramethylammonium hydroxide, tetraethylammonium hydroxide, tetrapropylammonium hydroxide, cetyltrimethylammonium bromide (CTAB), hexadecyltrimethylammonium chloride; hexadecyltrimethylammonium hydroxide hydrate, hexadecyltrimethylammonium p-toluenesulfonate, hexadecyltrimethylammonium bis-sulfonate, poloxamers having a weight average molecular weight ranging from 5,000 to 20,000 Daltons (Da), and combinations thereof; in the substantial absence of an alcohol solvent; under conditions such that a mesoporous silica composition having an average pore diameter ranging from 50 angstroms to 175 angstroms and a pore diameter distribution that, within one standard deviation of the mean thereof, is substantially unimodal, is formed.

In a second aspect, the invention provides a composition comprising a mesoporous silica composition having an average pore diameter ranging from 50 angstroms to 175 angstroms and a pore diameter distribution that, within one standard deviation of the mean thereof, is substantially unimodal.

DETAILED DESCRIPTION OF THE EMBODIMENTS

Figure 1:
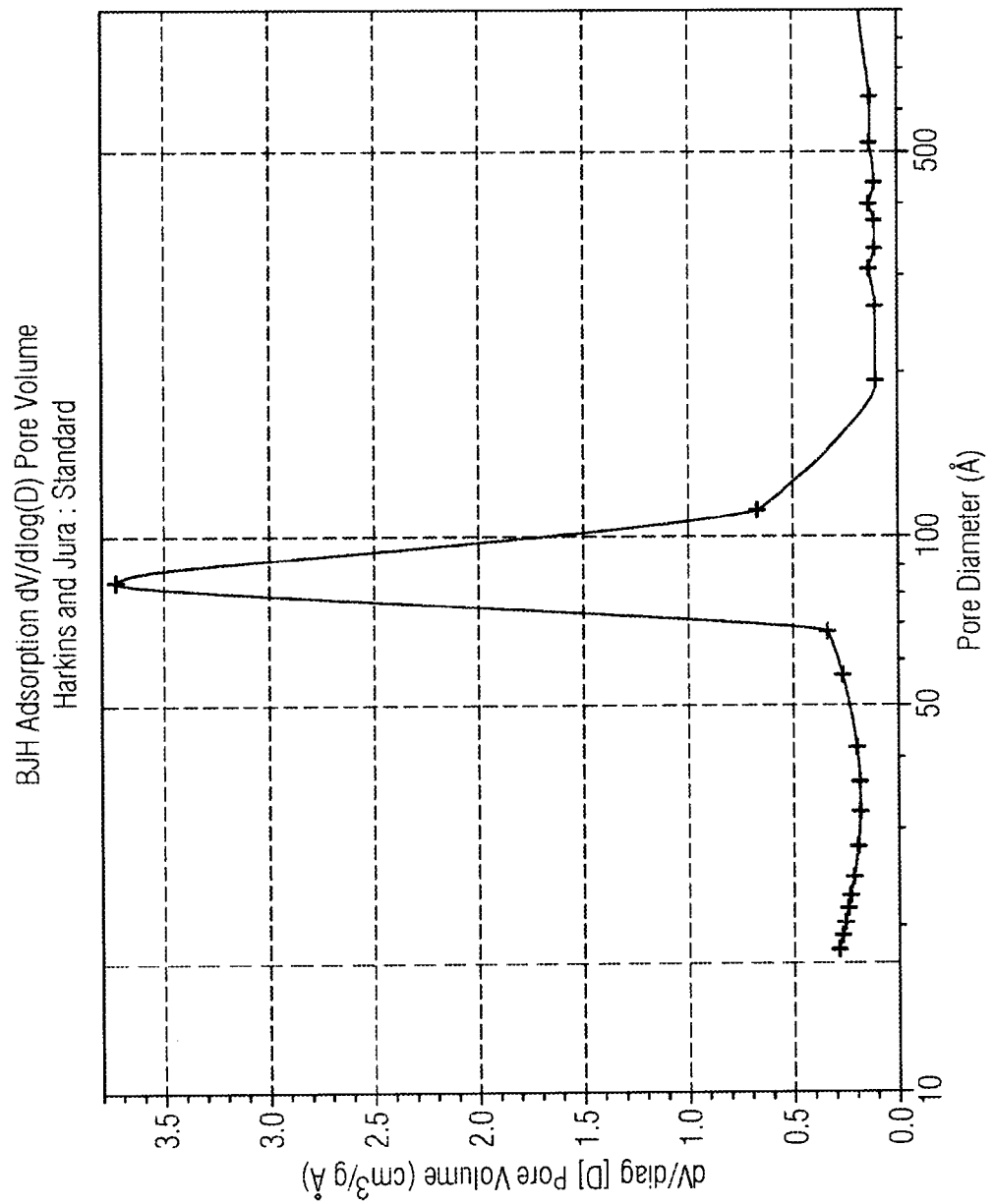
FIG. 1 depicts a pore diameter distribution of Example 1 in the Examples below.
Figure 2:
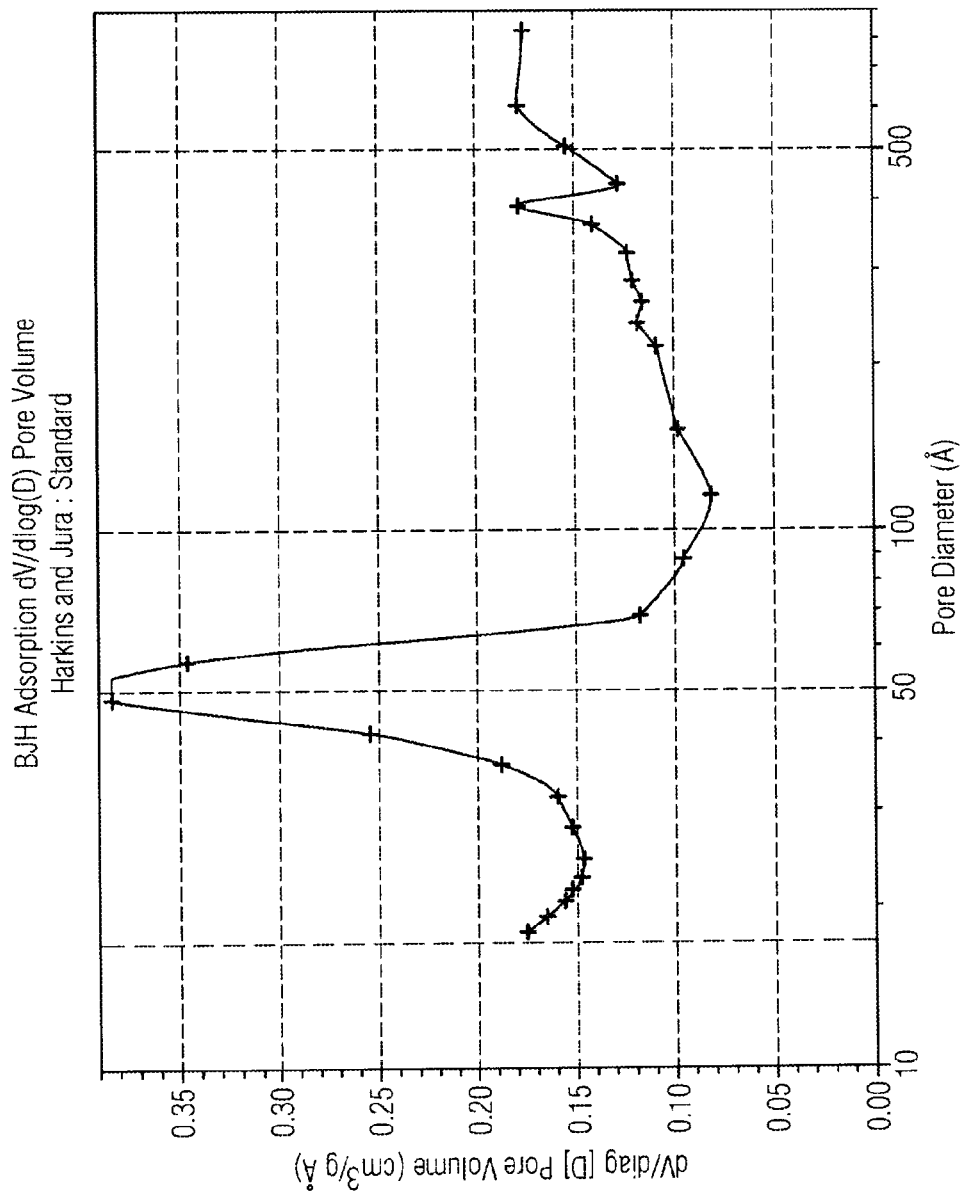
FIG. 2 depicts a pore diameter distribution of Example 2 in the Examples below.
Figure 3:
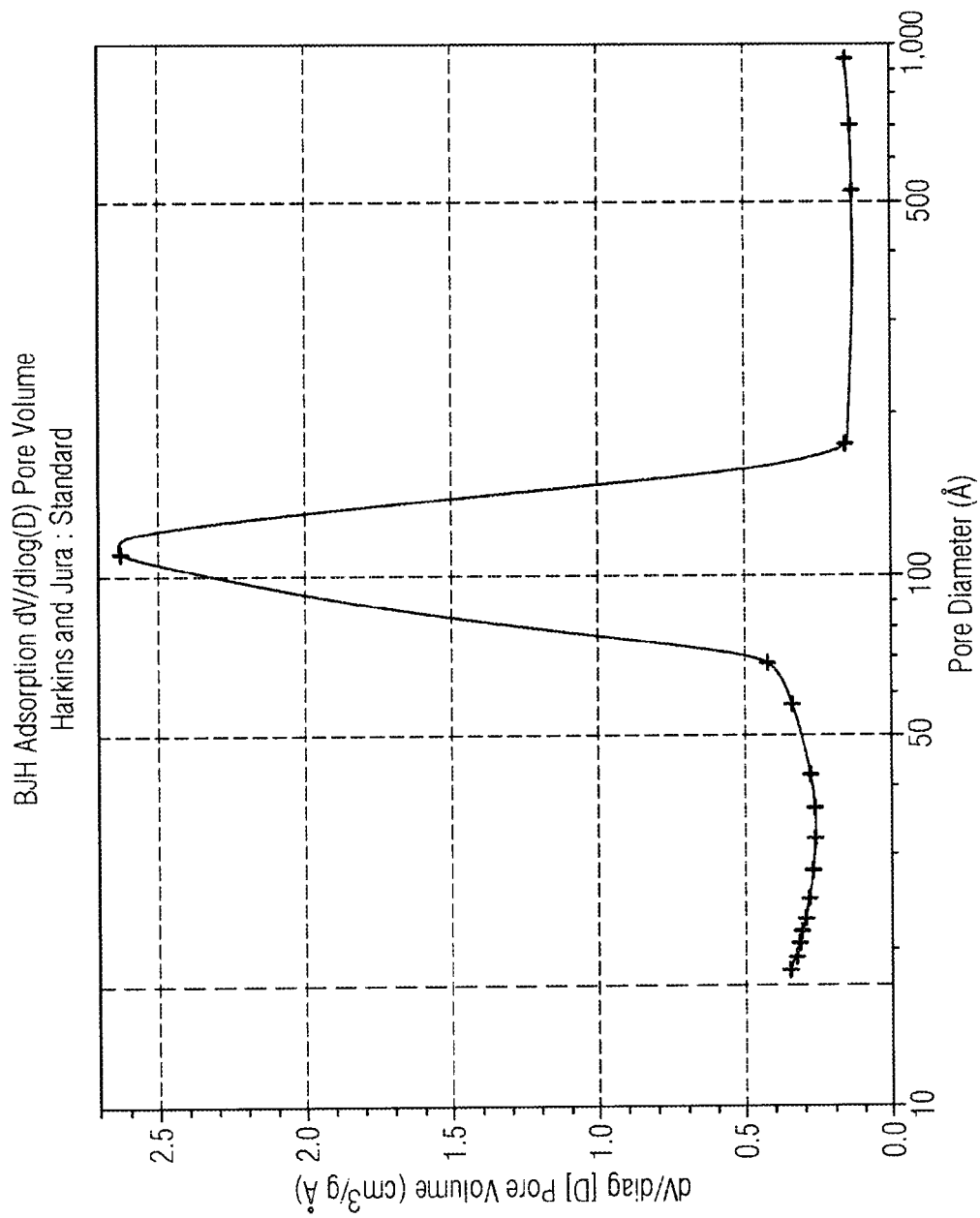
FIG. 3 depicts a pore diameter distribution of Example 3 in the Examples below.
Figure 4:
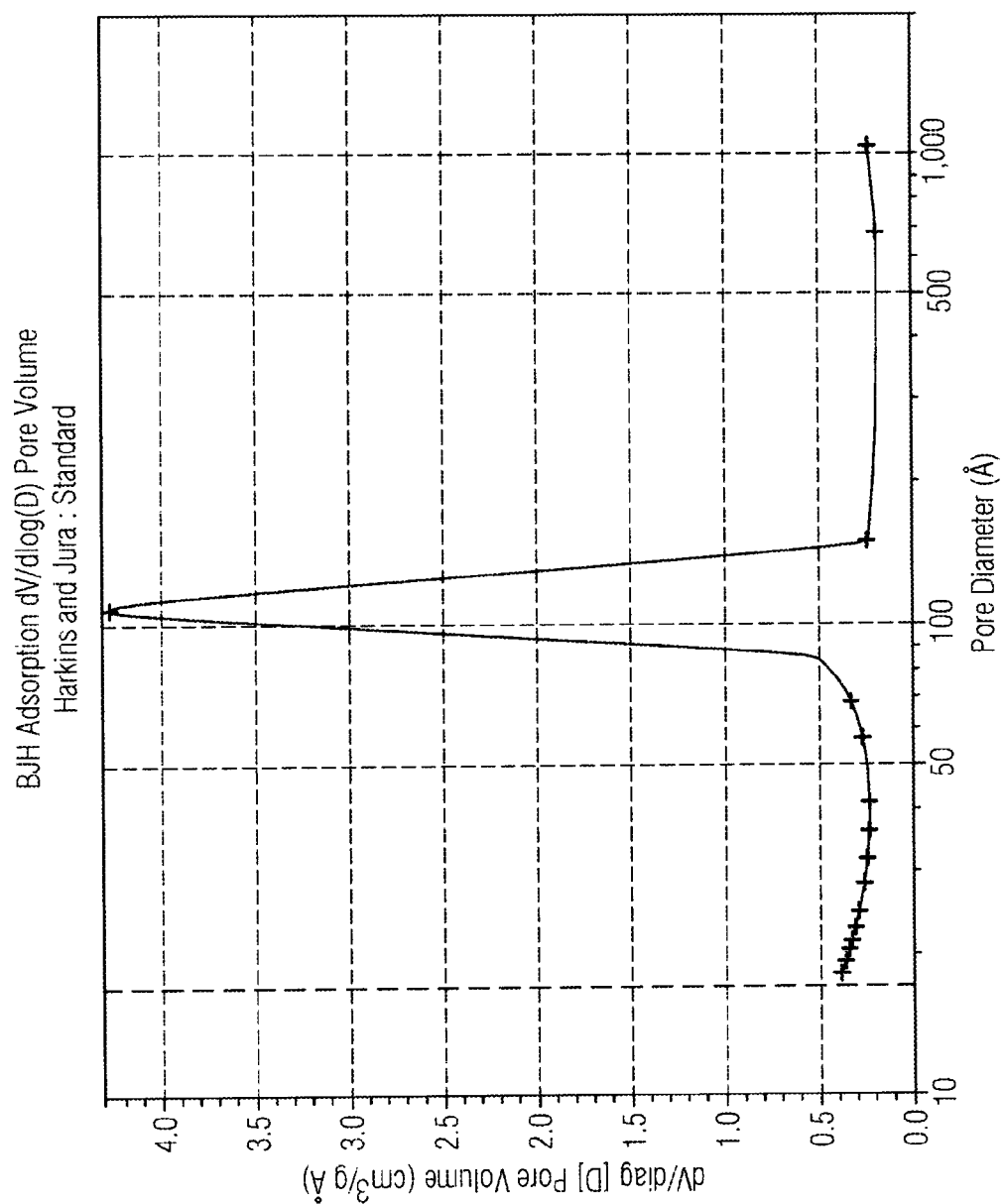
FIG. 4 depicts a pore diameter distribution of Example 4 in the Examples below.
Figure 5:
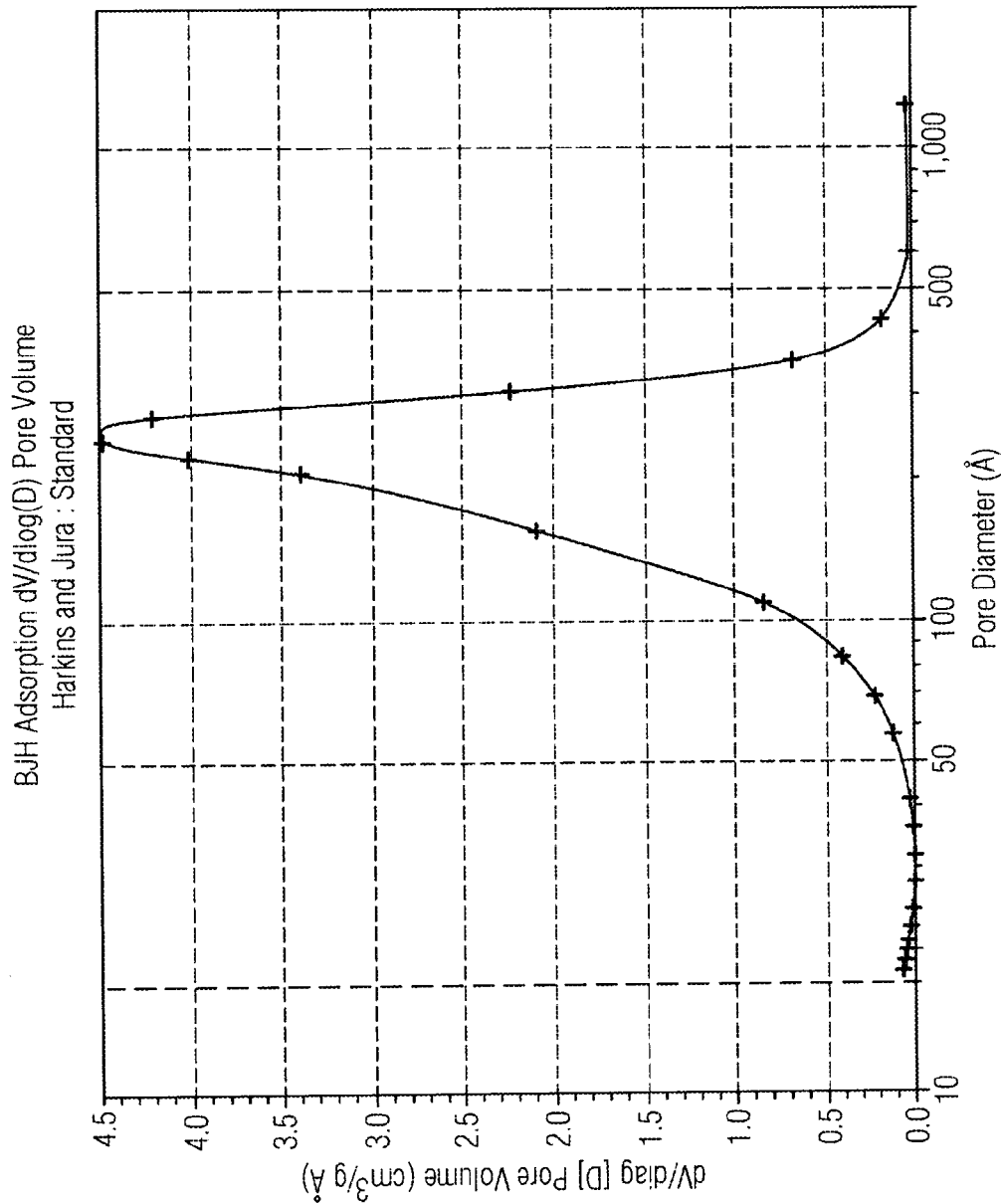
FIG. 5 depicts a pore diameter distribution of Example 5 in the Examples below.
Figure 6:
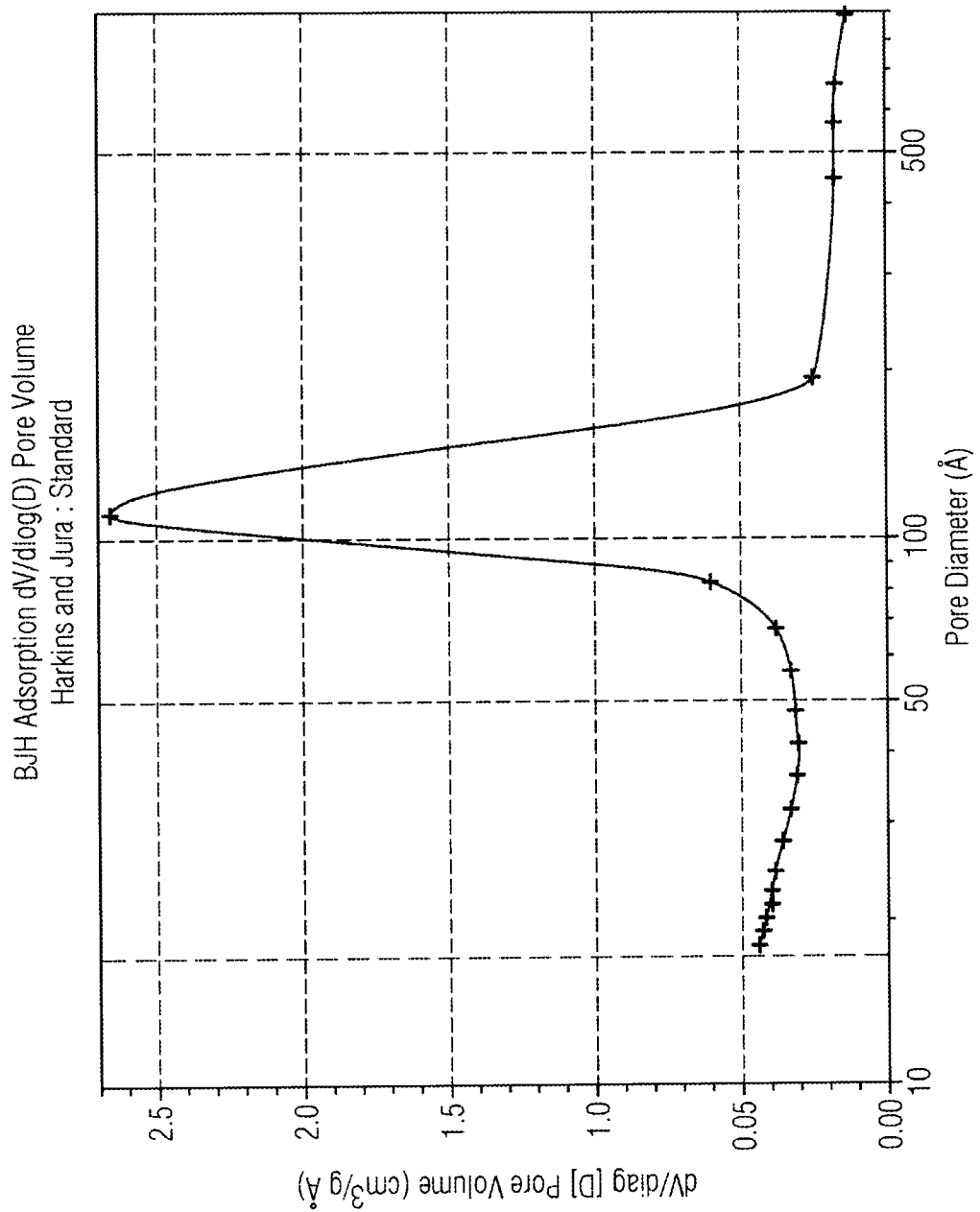
FIG. 6 depicts a pore diameter distribution of Example 6 in the Examples below.
Figure 7:
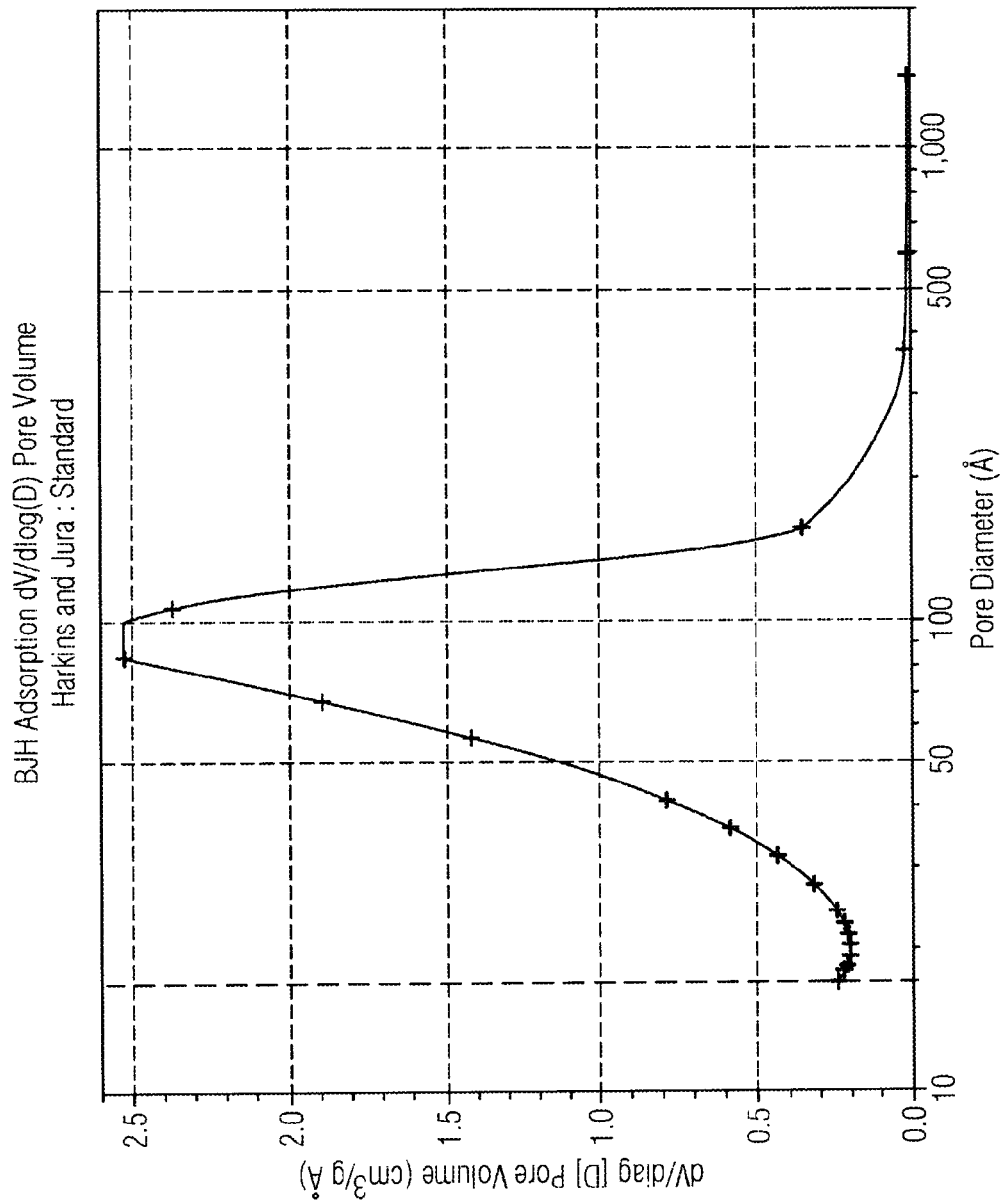
FIG. 7 depicts a pore diameter distribution of Example 7 in the Examples below.

The invention produces mesoporous silica compositions having in particular embodiments a relatively large average pore diameter, from 50 Å to 175 Å, and a relatively narrow, substantially unimodal pore diameter distribution, as described in greater detail hereinbelow. Because the average pore diameter may be controlled via selection of the starting components, the inventive compositions may be designed for preferential use in a wide variety of applications including, but not limited to, gas separations, in electronic devices for purposes such as regulation of current flow and for thermal stability, for drug and fragrance release, gas sensing, heavy metal removal, and water purification.

The mesoporous silica composition may be effectively prepared by a process generally defined as including contact of at least three (3) starting components. These starting components are (1) a structure-directing template selected from the group consisting of fully and partially hydrogenated and non-hydrogenated oils and combinations thereof; (2) water, and (3) silica. An optional fourth component, (4), is a structure-directing co-template, which is selected from the group defined hereinbelow.

Each of the components may be most conveniently sourced via commercial purchase, or via direct preparation prior to use in the invention. Starting component (1), the structure-directing template, is a least one oil. As the term is used herein, "oil" is defined as any of numerous mineral, vegetable, and synthetic substances, including in non-limiting embodiments animal and vegetable fats, which are generally slippery, combustible, viscous, liquid or liquefiable at room temperatures, and soluble in various organic solvents such as ether, but not in water. Therefore, such may include materials meeting this description that are obtained from plants and animals, from mineral deposits (e.g., as petroleum), and via synthesis. Included within these categories, in non-limiting example, are plant-based oils such as castor oil, mustard oil, cottonseed oil, rapeseed oil, palm oil, sunflower oil, peanut oil, soybean oil, corn oil, coconut oil, linseed oil, sesame oil, and combinations thereof; animal-based oils such as clarified butter, mineral-based oils such as hydrocarbon oils including hydrocracked and hydroisomerized oils and combinations thereof; synthetic oils such as silicone oils, polyalphaolefin oils, non-polyalphaolefin oils including diesters, polyolesters, alkylated naphthalenes, alkylated benzenes, and combinations thereof; and combinations thereof. Such may also be defined generally to include liquid triesters of glycerol and unsaturated fatty acids, including, for example, lipids, which are loosely defined as substances of biological origin that are soluble in non-polar solvents. In general, oils useful in the invention may be fully hydrogenated, partially hydrogenated, or non-hydrogenated, and either edible or non-edible. In certain particular embodiments, sunflower oil, coconut oil, linseed oil, sesame oil, corn oil, and soybean oil, and combinations thereof may be preferred for reasons such as convenience, cost and/or commercial availability, with coconut oil being in such embodiments often particularly preferred.

Starting component (2), water, used in the invention is preferably deionized (DI) water.

Starting component (3), silica, may be any conventionally known silica or silicate, such as fumed silica, colloidal silica, sodium silicate, tetraethyl orthosilicate (TEOS), or a combination thereof. In preferred embodiments a silica having a relatively high Brunauer-Emmett-Teller surface area, preferably at least 100 $m^2/g$, more preferably at least 120 $m^2/g$, and still more preferably at least 150 $m^2/g$, may be employed. This silica is, obviously, distinct from the mesoporous silica composition that is a product of the inventive process. Sources of the silica starting component (3) may be, for example, organic sources, such as rice husks, and/or mineral sources, such as sand, quartzite, talc and mica.

Where the formulation includes an optional starting component (4), a structure-directing co-template, such may be selected from tetramethylammonium hydroxide (TMAOH), tetraethylammonium hydroxide (TEAOH), tetrapropylammonium hydroxide (TPAOH), cetyltrimethylammonium bromide (CTAB), hexadecyltrimethylammonium chloride, hexadecyltrimethylammonium hydroxide hydrate, hexadecyltrimethylammonium p-toluenesulfonate, hexadecyltrimethylammonium bis-sulfonate, poloxamers having a weight average molecular weight ranging from 5,000 Da to 20,000 Da, and combinations thereof. Of these poloxamers, those having a weight average molecular weight ranging from 5,000 to 13,000 Da may be preferred in certain embodiments, and those having a weight average molecular weight ranging from 5,500 to 12,500 Da may be particularly preferred. Preparation of these may be by any effective means. For example, hydrolysis of tetramethylammonium cetyl iodide (TMACl) or tetramethylammonium bromide (TMABr) may be used to prepare TMAOH; hydrolysis of tetraethylammonium bromide (TEABr) may be used to prepare TEAOH; and hydrolysis of TPAOH may be used to prepare tetrapropylammonium bromide (TPABr). Preparation of cetyltrimethylammonium bromide (CTAB) may be via brominating a hexadecyl quaternary ammonium compound.

Another selection for the optional starting component (4), the structure-directing co-template may be a block copolymer surfactant, i.e., a block copolymer surfactant, also termed a "poloxamer." This poloxamer is desirably non-ionic and has a weight average molecular weight ranging from 5,000 to 20,000 Da, more desirably from 5,000 to 13,000 Da, still more desirably from 5,500 to 12,500 Da. Suitable non-limiting examples may include PLURONIC P-123, PLURONIC F-127, and combinations thereof. (PLURONIC is a trademark of BASF Corporation.) PLURONIC P-123 is a triblock copolymer based on poly (ethylene glycol)-poly(propylene glycol)-poly(ethylene glycol), having a molecular weight of about 5,800 Da. PLURONIC F-127 is described as a hydrophilic, nonionic surfactant polyol having a central hydrophobic block and a molecular weight of approximately 12,500 Da. In some embodiments, a combination of PLURONIC P-123 and PLURONIC F-127 may be employed. It may be useful to use a molar ratio of PLURONIC P-123 to PLURONIC F-127 ranging from 1.6:1 to 2,500:1.

In preparing the mesoporous silica materials of the invention, the required components (1)-(3) (or, in certain embodiments, (1)-(4)), respectively, are desirably combined in order such that contact between them is as extensive and continuous as possible, throughout a period of time until the inventive products are formed to a desired extent, preferably to or near a maximum yield thereof. Such may be conveniently carried out, in one particularly preferred embodiment, by adding the structure-directing template (1) to the water (2), then adding the silica (3) thereto. Where a structure-directing co-template (4) is to be included as a starting component, such may, in certain embodiments, be added to the water (2) prior to adding the structure-directing template (1) thereto. Those skilled in the art will obtain further direction and alternative embodiments via the Examples included in this specification and from knowledge generally available within the industry. During this process the components are desirably stirred together, at a rate described as "vigorous," which is preferably from 300 to 700 revolutions per minute (rpm). Adjustment of starting pH to a range of from 2.0 to 5.0 may be desirable, and conveniently effected by means of, for example, use of a 1.6 molar (M) hydrogen chloride (HCl) solution in representation of the water starting component (2). Stirring rate generally facilitates the synthesis process. In preferred embodiments, the temperature during the synthesis period is desirably maintained within a range from 25 degrees Celsius (° C.,) and 190° C., and more desirably from 25° C. to 170° C. The synthesis period may desirably range from 5 to 100 hours (h), and preferably from 10 h to 40 h, and pressure may desirably range from 101 kilopascals (kPa) to 1000 kPa. Such synthesis parameters may offer acceptable production levels within commercially practical limits.

Proportions of the starting components are desirably controlled in order to ensure formation of the inventive compositions. In general, based upon 1 mole (mol) of the selected silica (3), the amount of the structure-directing template (1) may desirably range from 0.1 mol to 1.0 mol. The amount of water (2) may desirably range from 20 mol to 80 mol, and preferably from 40 mol to 70 mol. The amount of the optional structure-directing co-template (4) may desirably range from 0.25 to 0.7 mol, preferably from 0.25 mol to 0.65 mol, and more preferably from 0.25 mol to 0.5 mol.

An additional component, a promoter (5), may, in some less preferred embodiments, be optionally included among the starting materials, particularly where tetraethyl orthosilicate (TEOS) is selected as the silica source. Such promoters may be selected from alkali and alkaline nitrates, sulfates, chlorides, and combinations thereof, including, in non-limiting example, sodium nitrate ($NaNO_3$). These materials may help to accelerate crystal growth in definite patterns, and also enhance thermal stability of the final mesoporous material. If a promoter is used, a desired amount is preferably from 0 mol to 0.3 mol, based on 1 mol of silica.

It is desirable in the present invention that alcohol, in any form, is absent or substantially absent from the synthesis mixture. In particular, this means that alcohol is not intentionally used as a solvent therein. The term "substantial absence" means, therefore, that, while such absence is desirably absolute, the presence of alcohol in trace amounts, less than 0.2 percent by weight, may be tolerated. Included within the definition of alcohols are any organic materials having a functional hydroxyl group, with the exception of those specifically named as possible first or second structure-directing template selections.

Once product synthesis is visually observed, the product may be filtered and washed using means and methods well known to those skilled in the art. Filtration using a suitable filter means, desirably of 650 to 2000 U.S mesh size, followed by washings in DI water, is desirable. Drying using conventional means and temperatures ranging desirably from 80° C. to 100° C., with or without subsequent calcinations(s) at temperatures ranging from 500° C. to 650° C. (with or without steam), may also be preferably employed, in order to increase the porosity of the final mesoporous silica material.

The final product is, in preferred embodiments, a mesoporous silica composition having unique physical characteristics. These characteristics may be generally described as including an average pore diameter ranging from 50 Å to 195 Å, preferably from 50 Å to 175 Å, and still more preferably from 60 to 165 Å, with a substantially unimodal pore diameter distribution, preferably with at least 90 weight percent (wt %) of the mesoporous silica falling within one standard deviation of the mean pore diameter. In particular embodiments at least 95 wt % falls within one standard deviation of the mean pore diameter. The term "substantially unimodal" takes its meaning from statistics, wherein a unimodal distribution is a probability distribution having a single mode, with the mode being the value at which the probability mass function takes its maximum value, i.e., the mode may be stated as being the most likely value. Graphically speaking, "substantially unimodal" means that the pore diameter distribution will exhibit only one peak, or only one major peak, with any other, lesser peaks present being mathematically insignificant to calculation of the maximum (most likely) value. This maximum value is herein, then, taken as being approximately equivalent to the distribution's mean. Furthermore, the mesoporous silica desirably exhibits a Brunauer-Emmett-Teller surface area ranging from 300, preferably 500, to 1000, preferably 800, $m^2/g$, and preferably from 500 to 800 $m^2/g$; and an average pore volume ranging from 0.4 to 1.5 $cm^3/g$, preferably from 0.7 to 1.5 $cm^3/g$, and still more preferably from 0.9 to 1.2 $cm^3/g$. Because of these characteristics, the inventive materials may be characterized, in summary, as having unexpectedly large pores diameters and unexpectedly narrow, substantially unimodal pore diameter distributions.

The inventive mesoporous silica also has an MCM-48 framework type, as defined by the International Zeolite Association (IZA). This means that its bicontinuous structure is still centered on the gyoid minimal surface (i.e., it is "cubic"), as is the case with all MCM-48 silicas. Thus, it is an MCM-48 silica having larger average pore diameter than many or most other MCM-48 silicas, thereby enabling its use in a variety of applications for which such other MCM-48 silicas may not be useful, for example, with separations involving relatively large biomolecules. Furthermore, because of the greater uniformity, i.e., narrower pore diameter distribution, it is anticipated that the performance of the inventive mesoporous silica in such applications will be enhanced due to improved selectivity. Confirmation of the given physical characteristics may be by means readily known to those skilled in the art, including, for example, X-ray diffraction (XRD), transmission electron microscopy (TEM), Fourier transmission infrared spectrophotometry (FTIR), Fourier transmission-Raman (FT-Raman), and/or nitrogen physiosorption.

EXAMPLES

Example 1

Place 75 milliliters (mL) of 1.6 M HCl in a 500 mL round bottom flask and dissolve 2.0 g of PLURONIC P-123 therein. Stir at room temperature for 30 minutes (min) and then add 3.0 g of sunflower oil. Increase the temperature to 45° C. and stir at this temperature for 1 hour (h) at 500 rpm. Next, add 4.4 g of TEOS and stir at the same rate at 50° C. for 24 h. After 24 h, transfer the mixture to an autoclave and heat at 105° C. for 96 h in an oven. Then cool to room temperature, filter, wash with hot water, and dry at room temperature for 2 days. Remove organics by heating the mixture in a furnace at 535° C. for 6 h.

Example 2

Follow the procedure of Example 1, except use silicone oil instead of sunflower oil.

Example 3

Follow the procedure of Example 1, except use natural clarified butter instead of sunflower oil.

Example 4

Follow the procedure of Example 1, except use coconut oil instead of sunflower oil.

Example 5

Follow the procedure of Example 4, except omit the PLURONIC P-123 and heat at 158° C. for 100 h.

Example 6

Follow the procedure of Example 4, except heat at 105° C. for 10 days.

Example 7

Follow the procedure of Example 5, except heat at 105° C. for 100 h.

Comparative Example A

MCF

Synthesize a mesoporous cellular foam (MCF) by dissolving 1 g of PLURONIC P-123 in 37.5 mL water at room temperature with stirring, then add 4 g of 1,3,5-trimethylbenzene (TMB), i.e., a ratio of TMB to PLURONIC P-123 of 4:1. Add 2.2 g of TEOS and adjust pH by adding 6.1 g of ammonium hydroxide solution. Cover and stir the mixture to form a microemulsion. Cover and stir the microemulsion at 38° C. for 24 h and then age at 110° C. for 24 h in an autoclave. Rinse the as-synthesized materials with DI water and dry under vacuum for 12 h.

Comparative Example B

MCM-48

Synthesize MCM-48 using an aqueous micellar solution containing a quaternary ammonium surfactant, $C_{16}H_{33}(CH_3)_3NBr$ (cetyltrimethylammonium bromide, or CTAB), NaOH, and DI water under stirring for 1 h. Add this solution to TEOS. The molar composition of the mixture is 0.59 CTAB/1.0 TEOS/0.5 NaOH/61 $H_2O$. Stir the mixture for 90 min and transfer it to an autoclave, allowing the reaction to proceed at 100° C. for 96 h. Filter the MCM-48 silica and wash with DI water, then dry and calcine it at above 500° C.

Comparative Example C

MCM-41

Synthesize MCM-41 according to the molar ratio of components: 1.0 Si: 0.2 CTAB: 0.25 TMAOH: 40 $H_2O$. Add fumed silica to a mixture of CTAB, TMAOH and $H_2O$, and stir the solution for 2 h at room temperature. Transfer the resulting gel into a Teflon-lined autoclave and age at 150° C. for 48 h. After aging, filter the gel, wash it several times with DI water, dry it, and calcine it at above 500° C.

Comparative Example D

Compare the surface areas of Examples 1-4 based on their nitrogen physiosorption, i.e., Brunauer-Emmett-Teller, surface areas. Record results in Table 1.

TABLE 1

Nitrogen Physiosorption Data

| Example # | Surface Area (m$^2$/g) | Pore Volume (cm$^3$/g) | Pore Diameter (Å) | Quantity Adsorbed (cm$^3$/g STP*)/ (m$^2$/g) |
|---|---|---|---|---|
| 1 | 573.8028 | 0.896128 | 78.170 | 1.0097 |
| 2 | 355.4574 | 0.408315 | 73.324 | 0.7408 |
| 3 | 700.2253 | 1.088587 | 78.133 | 1.0051 |
| 4 | 53.4825 | 1.183113 | 83.338 | 1.0151 |

*Standard Temperature and Pressure

Comparative Example E

Compare weight loss of the samples prepared in Examples 1-4 (Ex. 1-4) and Comparative Examples A-C (CEx. A-C). Weight loss illustrates the amount of organic template removed by calcination.

TABLE 1

Weight loss of the as-synthesized mesoporous materials (containing organic template) in air by thermogravimetric analysis (TGA)

| Ex. or CEx. | Weight loss (%) | | | | Total weight loss (%) |
|---|---|---|---|---|---|
| | RT*-100° C. | 100-250° C. | 250-500° C. | 500-850° C. | |
| Ex. 1 | 1.0 | 36.0 | 25.0 | 6.5 | 68.5 |
| Ex. 2 | 1.3 | 23.0 | 17.0 | 1.3 | 42.6 |
| Ex. 3 | 1.5 | 54.0 | 18.0 | 1.3 | 74.8 |

TABLE 1-continued

Weight loss of the as-synthesized mesoporous materials (containing organic template) in air by thermogravimetric analysis (TGA)

| Ex. or CEx. | Weight loss (%) | | | | Total weight loss (%) |
|---|---|---|---|---|---|
| | RT*-100° C. | 100-250° C. | 250-500° C. | 500-850° C. | |
| Ex. 4 | 1.0 | 69.2 | 4.0 | 0.8 | 75 |
| CEx. A | 2 | 2 | 50 | 4 | 58 |
| CEx. B | 4 | 50 | 4 | 2 | 60 |
| CEx. C | 2 | 40 | 5 | 11 | 58 |

*Room temperature

Comparative Example F

Compare surface characteristics of samples prepared in Ex. 1-7 and CEx. A-C.

TABLE 2

Characterizing data.

| Ex. or CEx. | Template type | Surface Area (m$^2$/g) | Pore Volume (cm$^3$/g) | BET average pore diameter(Å) |
|---|---|---|---|---|
| Ex. 1 | Sunflower oil + P-123 | 573.8 | 0.90 | 78 |
| Ex. 2 | Silicone oil + P-123 | 355.5 | 0.41 | 73 |
| Ex. 3 | Clarified butter + P-123 | 700.2 | 1.09 | 78 |
| Ex. 4 | Coconut Oil + P-123 | 753.5 | 1.18 | 83 |
| Ex. 5 | Only coconut oil; no P-123; 158° C. | 353 | 1.45 | 164.07 |
| Ex. 6 | Coconut oil + P = 123 105° C. reaction temp, 10 days. | 785 | 1.20 | 60.88 |
| Ex. 7 | Only coconut oil; no P-123, 105° C. reaction temp | 674 | 1.21 | 72.02 |
| CEx. A | P-123 + TMB | 1006 | 2.07 | 82 |
| CEx. B | CTAB | 1425 | 1.08 | 25 |
| CEx. C | CTAB + TMAOH | 986 | 0.95 | 30 |

Comparative Example G

Figure 8:
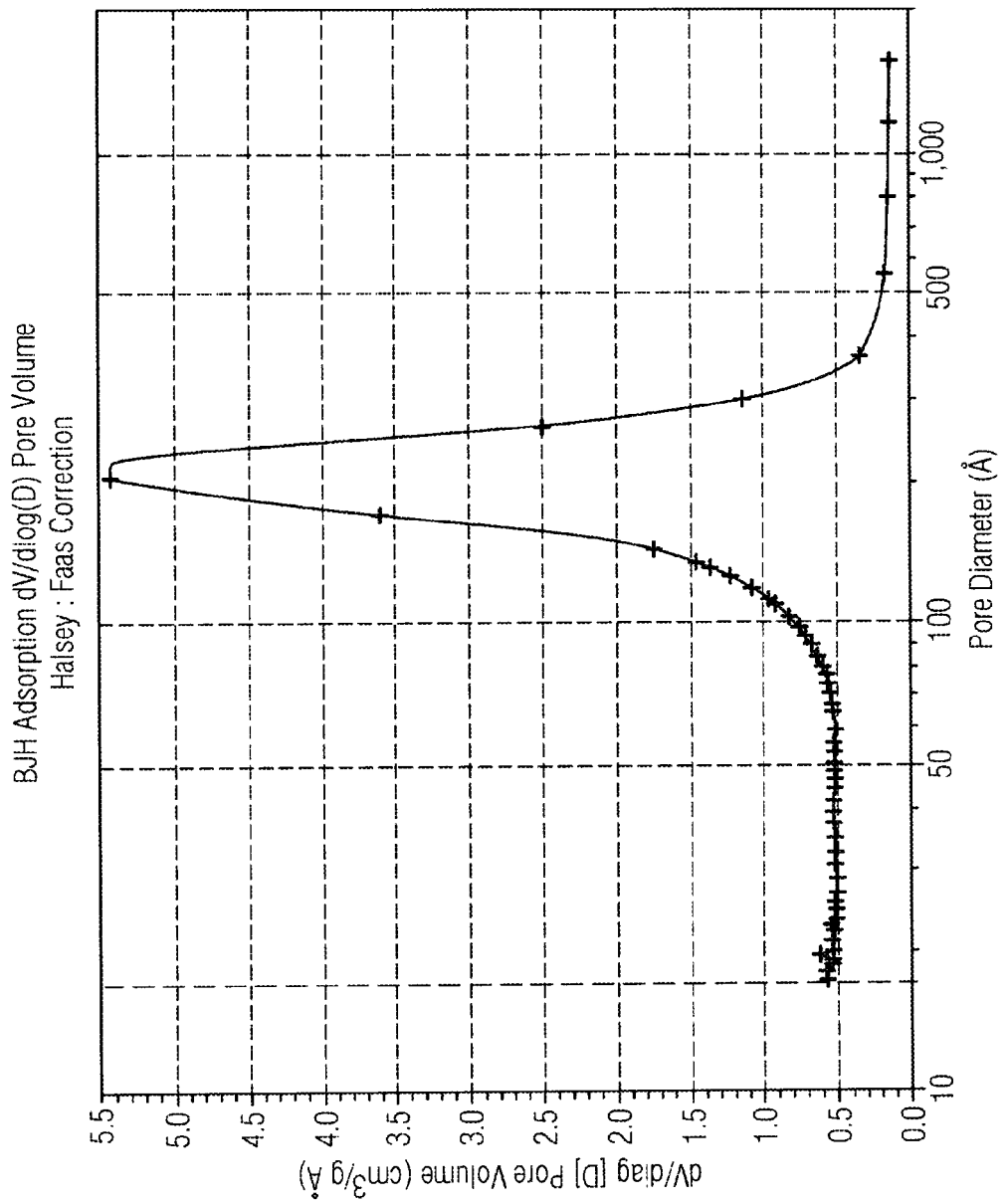
FIG. 8 depicts a ore diameter distribution of Comparative Example A in the Examples below.
Figure 9:
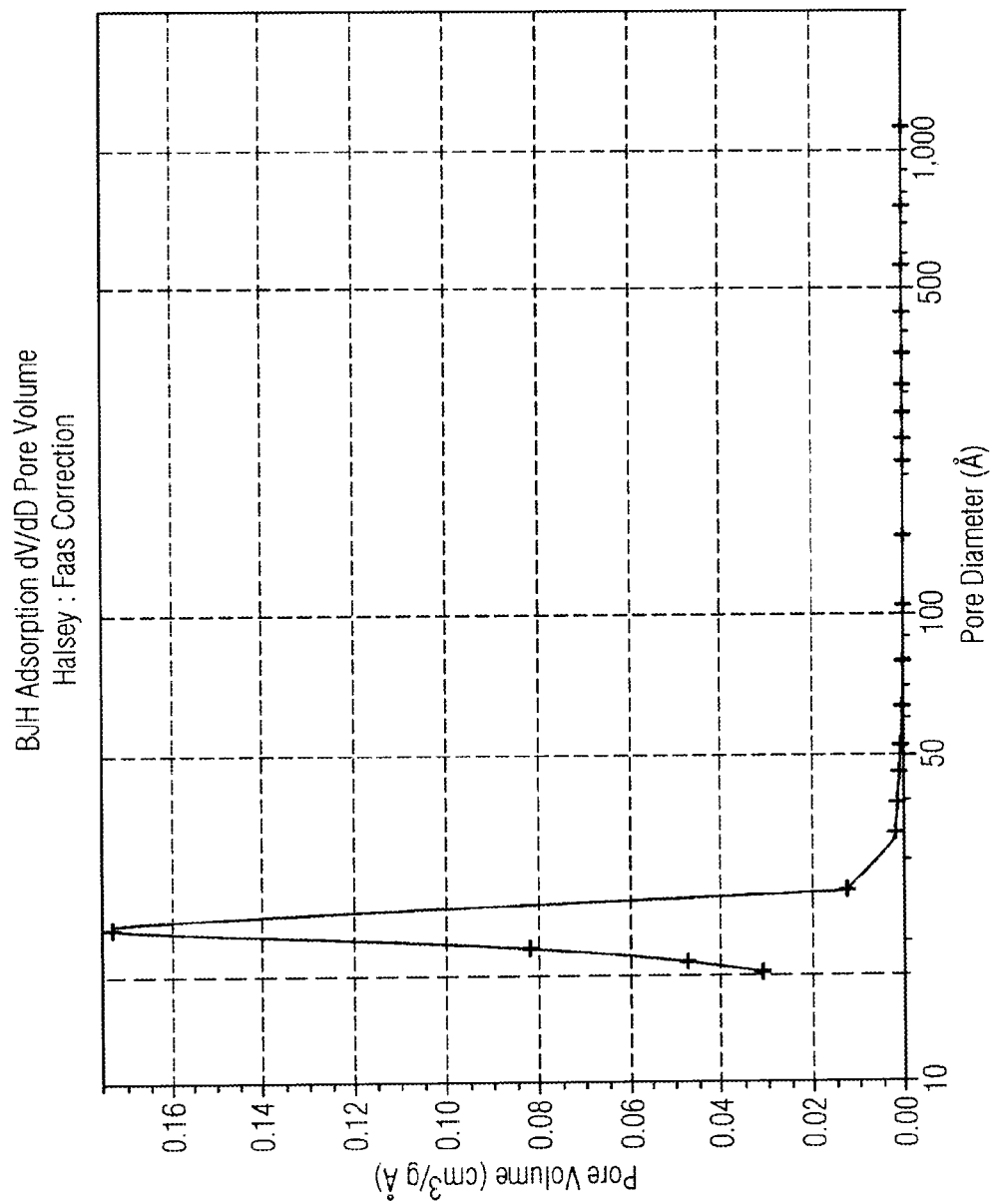
FIG. 9 depicts a pore diameter distribution of Comparative Example B in the Examples below.

Measure and graph pore diameter distributions for samples from Examples 1-7 and Comparative Examples A-B in order to determine mean and standard deviations of pore diameter versus total pore volume. Pore volume is defined as the sum of the volumes of all pores in one gram of adsorbent, or the volume of pores in cubic centimeters (cm$^3$) per gram of material. These graphs show that pore volumes and diameters do not necessarily correlate, and that, for example, a high pore volume may not indicate large pore diameters, and vice versa. FIGS. 1-7 correspond to Examples 1-7; FIG. 8 corresponds to Comparative Example A; and FIG. 9 corresponds to Comparative Example B. FIGS. 1-7 show that the inventive Examples 1-7 show a pore diameter distribution that, within one standard deviation of the mean thereof, are substantially unimodal as defined.

What is claimed is:

1. A process for preparing a mesoporous silica composition comprising contacting as starting components (1) a structure-directing template comprising plant-based oils selected from castor oil, mustard oil, cottonseed oil, rapeseed oil, palm oil, sunflower oil, peanut oil, soybean oil, corn oil, coconut oil, linseed oil, sesame oil, and combinations thereof; (2) water; (3) silica; and (4) a structure-directing co-template comprising poloxamers having a weight average molecular weight ranging from 5,000 to 20,000 Daltons (Da), and combinations thereof; in the substantial absence of an alcohol solvent; under conditions such that a mesoporous silica having an average pore diameter ranging from 50 angstroms to 175 angstroms and a pore diameter distribution that, within one standard deviation of the mean thereof, is substantially unimodal, is formed.

2. The process of claim 1, wherein (4) is a poloxamer comprising (a) a non-ionic triblock copolymer based on poly(ethylene glycol)-poly(propylene glycol)-poly(ethylene glycol), having a molecular weight of 5,800 Daltons, and (b) a hydrophilic nonionic, surfactant polyol having a central hydrophobic block and a molecular weight of 12,500 Daltons.

3. The process of claim 1, wherein, based upon one mole of the silica (3), the amount of the structure-directing template (1) ranges from 0.1 to 1.0 mole; the amount of the water (2) ranges from 20 to 80 moles; and the amount of the optional structure-directing co-template (4) ranges from 0 to 0.7 mole.

4. The process of claim 1, wherein the starting components are stirred at a rate from 300 to 700 revolutions per minute while the mesoporous silica composition is forming.

5. The process of claim 1, wherein the conditions are selected from the group consisting of a temperature ranging from 25° C. to 190° C.; a time ranging from 5 to 100 hours; a pressure ranging from 101 to 1000 kilopascals; and combinations thereof.

6. The mesoporous silica composition formed by the process of claim 1.

7. The mesoporous silica composition of claim 6 having an average pore diameter ranging from 60 angstroms to 165 angstroms and a pore diameter distribution that, within one standard deviation of the mean thereof, is substantially unimodal.

8. The mesoporous silica composition of claim 6, further defined as having a Brunauer-Emmett-Teller surface area from 300 to 1000 square meters per gram and an average pore volume ranging from 0.4 to 1.5 cubic centimeters per gram.

* * * * *